2 Sheets. Sheet 1.

Bradshaw & Brown,
Water Meter.

No. 85,900. Patented Jan. 19, 1869.

Witnesses.
R. T. Rawson.
Geo. E. Pevey.

Inventors.
John A. Bradshaw
Wm. H. Brown

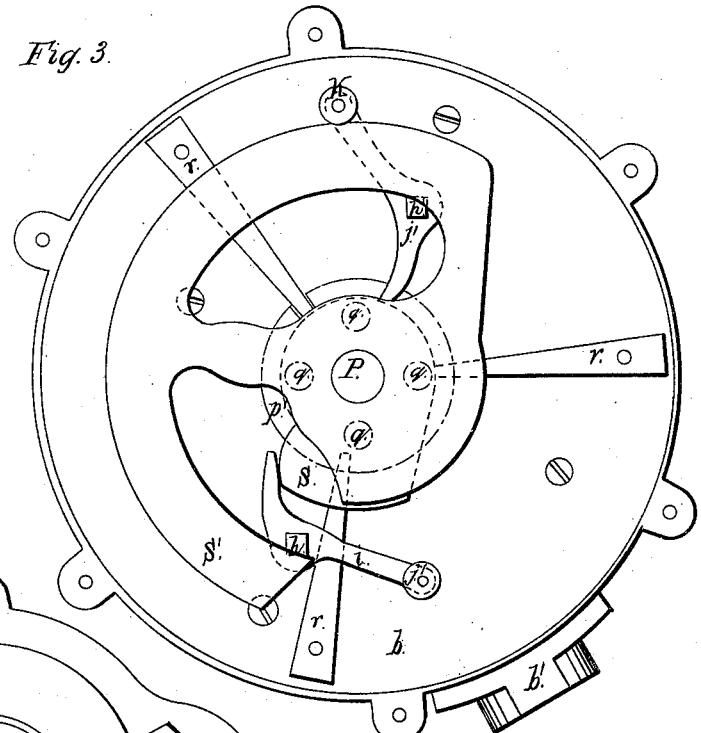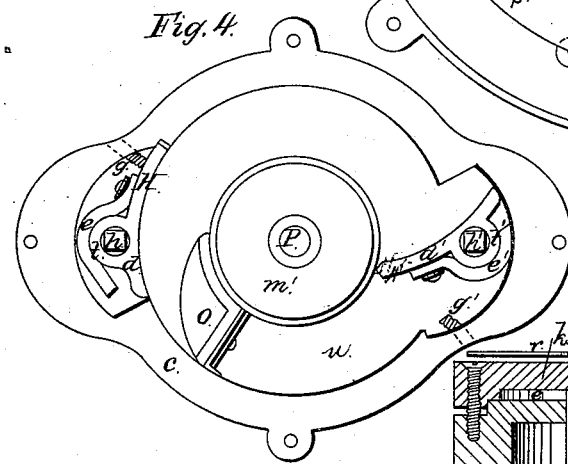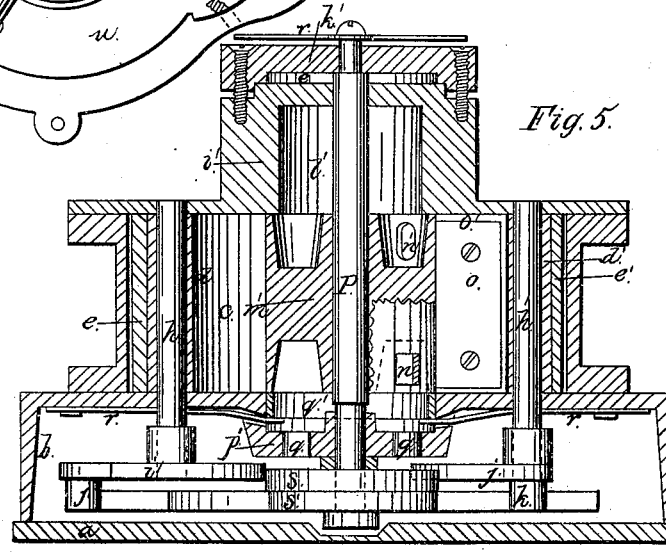

JOHN A. BRADSHAW AND WILLIAM H. BROWN, OF LOWELL, MASSACHUSETTS.

Letters Patent No. 85,900, dated January 19, 1869.

IMPROVEMENT IN WATER-METERS.

The Schedule referred to in these Letters Patent and making part of the same.

*To all whom it may concern:*

Be it known that we, JOHN A. BRADSHAW and WILLIAM H. BROWN, both of Lowell, in the county of Middlesex, and State of Massachusetts, have invented new and useful Improvements in Water-Meters; and we do hereby declare that the following is a full and exact description thereof, reference being had to the accompanying drawings, and to the letters of reference marked thereon.

The nature of our invention consists in providing a water-meter that will be self-operating, its several devices being encased and protected by suitable coverings or shells, and operated therein.

This invention accomplishes a twofold object: first, in measuring the amount of water used, or which passes through the same, accurately; second, whilst the water is passing through the same, by its peculiar arrangement of devices, the water may be forced from the same to any part of the building required.

The object of this invention is to provide and furnish a meter that will accurately measure and indicate the amount of water used, and force the same as desired, combining in itself compactness, durability, cheapness, utility, and strength.

To enable others skilled in the art to make and use our invention, we will proceed to describe its construction and operation.

Figure 3 represents a plan of the bottom case, with its cover removed, showing the operation of the levers, cams, and devices contained therein.

Figure 4 represents a plan of the meter-case, showing the location and operation of the cylinder with its float and footholds.

Figure 5 represents a section through A and B of fig. 1.

Similar letters in the different figures indicate corresponding parts.

Figure 1:
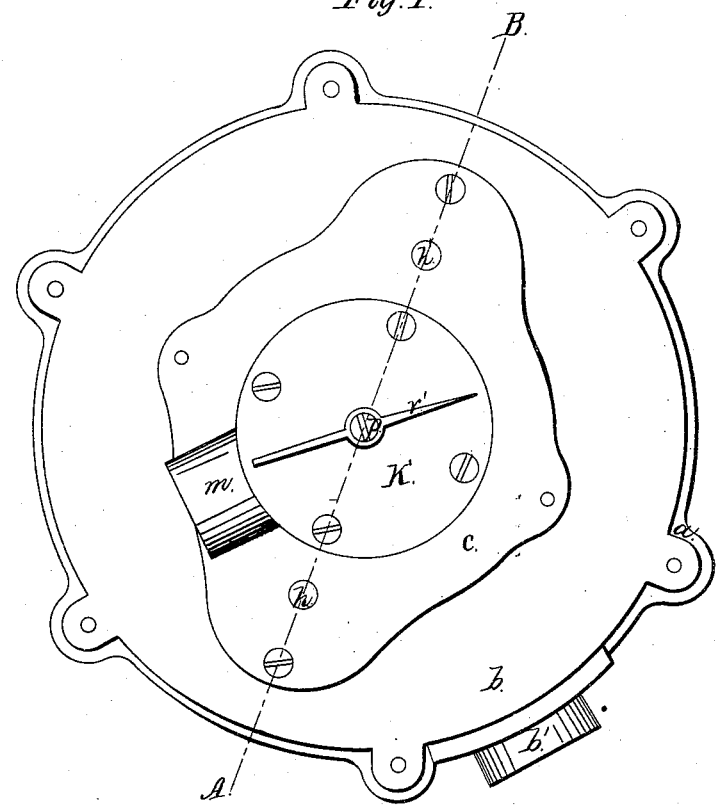
Figure 1 represents a plan of our improved water-meter.
Figure 2:
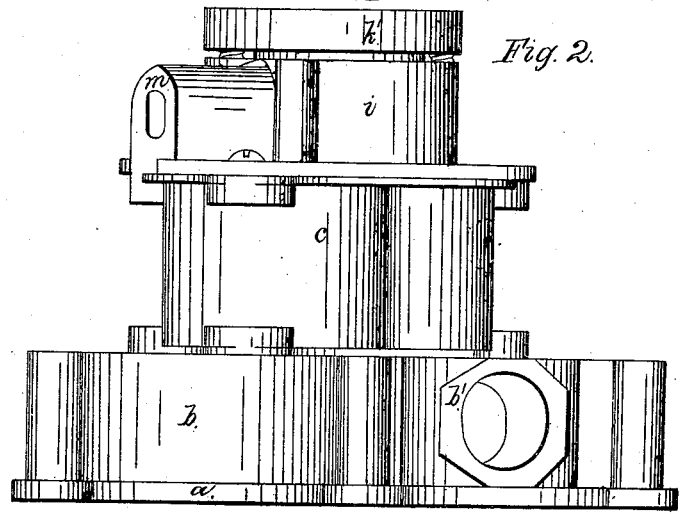
Figure 2 represents a side elevation of the same.

$a$ represents the bottom plate, on and to which is secured, by means of screws or bolts, the case $b$. The periphery of this case, $b$, is provided with an orifice, which connects with the pipe or tank by means of the coupling $b'$, for the supply of water to the meter.

$c$ is the meter-case, which is finished as desired, and secured to the case $b$ by means of screws or bolts.

The inside surface of case $c$ is finished on a true circle from the centre of the same, and provided with oval recesses in its periphery, located on a line directly across its axis, of proper size and shape for the reception of the footholds $d$ and $d'$.

These footholds (their inside surface being finished true on a radius with the meter-case $c$) are provided with suitable elastic packings, $e$ and $e'$, which are secured to the wings $f$ and $f'$ of the same.

These wings, $f$ and $f'$, when closed, are kept in position by the adjustable screws $g$ and $g'$, which are located and pass through the case $c$, near the top and bottom of said wings $f$ and $f'$.

The footholds $d$ and $d'$ are further provided with shafts $h$ and $h'$. Their journals are fitted in bearings in the plate of the outlet-case $i$, which is secured to the meter-case $c$, the other ends of said shafts passing through bearings in the plate $p'$, on which are located the levers $i'$ and $j$, they being provided with friction-rollers $j'$ and $k$.

Secured to the outlet-case $i$ is the plate or cap $k'$, which may be used for a dial, or a dial may be secured to the same.

Between this cap $k'$ and outlet-case $i$, a chamber or recess, $l$, is formed, for the reception of packing, if required.

$l'$ is a chamber, which is formed in the outlet-case $i$, this chamber being supplied with a discharge-orifice, $m$.

$m'$ is a cylinder, its length corresponding with the depth of the meter-case $c$, its diameter of the required size, its ends being recessed and supplied with a receiving-orifice, $n$, and discharge-orifice $n'$, through the periphery or rim of the cylinder $m'$.

This cylinder $m'$ is also furnished with a suitable float, $o$, which is firmly secured to the periphery of the same, and is provided with elastic packing $o'$ on its three working-sides, which constitutes it self-packing.

The cylinder $m'$ is firmly secured to the shaft $p$, which passes through its centre, bearings being formed in the cap $k'$, and projection-plate $p'$ in the case $b$.

This projection-plate $p'$ is provided with holes $q\ q\ q$, as indicated by red lines in fig. 3, the area of them all being double the area of the discharge-orifice $m$.

This plate $p'$ is further provided with a packing-ring, $q'$, which is operated by means of the springs $r\ v\ v$, its diameter being the same as the cylinder $m'$, which completely seals and packs both ends of the said cylinder.

Attached to the extreme end of the shaft $p$, directly over the dial-plate $k'$, is the needle or finger $v'$.

Secured to the other end of said shaft is the double cam $s$ and $s'$, the working-periphery of the cam $s$ operating directly against the levers $i'$ and $j$, which close the footholds $d$ and $d'$ alternately.

The working-periphery of the cam $s'$ operates against the friction-rollers $j'$ and $k$, which open and keep open alternately the footholds $d$ and $d'$, which, with the assistance of the pressure of water against the same, prevent the escape of water between the footholds $d$ and $d'$ and periphery of the cylinder $m'$.

The meter being thus constructed, and its several devices arranged, adjusted, and enclosed in their respective cases, it is then ready for use. Water being let into the same through the coupling $b'$, filling the case $b$ by its pressure, it then passes through the holes $q\ q\ q$, represented by red circles in fig. 3 of the drawings, in and through the orifice $n$. The pressure of this water against the float $o$ causes the cylinder $m'$ to revolve, carrying the cams $s$ and $s'$, which operate the levers $i'$ and $j$, opening and closing the footholds $d$ and $d'$ just at the right moment to discharge the water through the orifice $n'$ in the cylinder $m'$ to the chamber $l'$, where it is forced through the discharge-orifice $m$ into pipes, and thence conveyed as desired.

This arrangement of the cams $s$ and $s'$ and levers $i'$ and $j$ operating the footholds $d$ and $d'$, forms a perfect and self-adjusting cut-off, so much so, they being so nicely adjusted, that there is no connection between the two orifices $n$ and $n'$ simultaneously, but they are entirely disconnected and separated; to wit, whilst the orifice $n$ is receiving the water and filling the space $u$, as seen in fig. 4, between the footholds $d'$ and float $o$, this water received cannot be discharged through the orifice $n'$ until the float $o$ passes the foothold $d$, and is cut off by the same; then this water received is compelled to discharge through the orifice $n'$ with force, by the action of the float $o$, which is carried forward by a new supply of water passing through the orifice $n$.

The measurement and capacity of the meter-case $c$, with one revolution of the cylinder $m'$, being indicated by the finger $r'$ over the dial $k'$, the observer, at sight, is enabled correctly to tell the number of quarts or gallons of water discharged and used, thus forming an accurate, reliable, self-operating pressure-meter.

What we claim as our invention, and desire to secure by Letters Patent, is—

1. In combination with the footholds $d$ and $d'$, the double cam $s$ and $s'$ and levers $i'$ and $j$, when arranged to operate the same alternately, as described, and for the purposes fully set forth.

2. The combination and arrangement of the case $b$, double cam $s$ and $s'$, levers $i'$ and $j$, with friction-rollers $j'$ and $k$, meter-case $c$, cylinder $m'$, with float $o$, footholds $d$ and $d'$, with their packing $e$ and $e'$, outlet-case $i$, dial $k'$, and chambers $l$ and $l'$, all when arranged to operate substantially as herein described.

JOHN A. BRADSHAW.
WM. H. BROWN.

Witnesses:
R. T. RAWSON,
GEO. E. PEVEY.